United States Patent [19]

Touval

[11] 4,021,406

[45] May 3, 1977

[54] FLAME RETARDANT COMPOSITIONS

[75] Inventor: Irving Touval, Edison, N.J.

[73] Assignee: M & T Chemicals Inc., Greenwich, Conn.

[22] Filed: Sept. 16, 1975

[21] Appl. No.: 613,961

Related U.S. Application Data

[60] Division of Ser. No. 361,895, May 21, 1973, Pat. No. 3,912,792, and a continuation-in-part of Ser. No. 278,016, Aug. 4, 1972, abandoned, which is a continuation-in-part of Ser. No. 175,694, Aug. 27, 1971, abandoned.

[52] U.S. Cl. .......................... 260/45.75 B; 252/8.1; 260/45.7 P; 260/45.7 R; 260/863; 260/865; 260/880 R

[51] Int. Cl.$^2$ ...................... C08K 3/22; C08K 5/02; C08K 5/52

[58] Field of Search ................ 260/45.7 P, 45.75 B, 260/865; 252/8.1

[56] References Cited

UNITED STATES PATENTS

| | | | |
|---|---|---|---|
| 3,158,588 | 11/1964 | Johnson | 260/45.75 |
| 3,266,918 | 8/1966 | Schappel et al. | 106/165 |
| 3,347,822 | 10/1967 | Jenkner | 260/45.75 |
| 3,392,136 | 7/1968 | Hindersinn et al. | 260/31.8 |
| 3,557,053 | 1/1971 | Miller | 260/45.7 |
| 3,576,780 | 4/1971 | Jackson, Jr. | 260/30.6 |
| 3,845,012 | 10/1974 | Bernardo | 260/45.75 |
| 3,883,471 | 5/1975 | Stackman et al. | 260/40 |
| 3,920,459 | 11/1975 | Allen | 106/15 |

OTHER PUBLICATIONS

Hilado, "Flammability Handbook for Plastics", 1969, pp. 82–86.

*Primary Examiner*—Melvyn I. Marquis
*Assistant Examiner*—R. A. White
*Attorney, Agent, or Firm*—Robert P. Auber; Kenneth G. Wheeless; Robert Spector

[57] ABSTRACT

The resistance to both flaming and glowing combustion exhibited by polymer compositions wherein the flame retarding agent is comprised at least in part of a halogen-containing organic compound in combination with an antimony oxide is significantly increased by including specified halogenated phosphates, thiophosphates or thiophosphoryl chlorides as part of the flame retarding agent. The presence of sulfur in the composition reduces the total amount of flame retarding agent required to achieve an SE-0 rating in the UL 94 vertical position burning test.

6 Claims, No Drawings

FLAME RETARDANT COMPOSITIONS

BACKGROUND OF THE INVENTION

This is a division of application Ser. No. 361,895, filed May 21, 1973 now U.S. Pat. No. 3,912,792.

This application is a continuation-in-part of application Ser. No. 278,016, filed Aug. 4, 1972, now abandoned which is turn is a continuation-in-part of application Ser. No. 175,694, filed Aug. 27, 1971 and now abandoned.

This invention relates to improved flame retardant materials.

This invention further relates to a method for enhancing the flame retardancy imparted to inherently flammable materials by the combination of antimony oxide with halogen-containing organic compounds.

The inherent flammability of many materials, including synthetic organic polymers, has restricted their use for numerous applications, particularly in children's wearing apparel, in the construction industry, and as decorating materials for commercial aircraft and locations of public accommodation. A variety of substances have been used to impart flame retardancy to inherently flammable substrates. Halogen-containing organic compounds, particularly when used in combination with antimony trioxide, are effective flame retarding agents.

In the absence of a flame retardant, many materials are completely consumed by flame once they are ignited. The addition to many organic polymers of about 37% by weight of a mixture comprising two to three parts of a halogen-containing hydrocarbon and one part of antimony trioxide yields a material which, at most, burns very slowly once the igniting flame is removed; however, at flame temperatures many of these thermoplastic polymers melt to form liquids which burn and can, therefore, ignite flammable material with which they come in contact. This is most undesirable since it could result in spreading of a fire to areas which could otherwise be unaffected. In addition, once the flame is extinguished, the materials continue to glow for as long as several minutes. The glowing areas generate vapors which could be toxic, and present the potential hazard of reigniting into flaming combustion under the proper conditions. Increasing the concentration of flame retardant does little, if anything, to reduce the flaming and glowing types of combustion and more importantly, adversely affects the strength and other desirable properties of the substrate. The presence of many additives, including flame retardants, degrades the properties of the unmodified polymer to an extent which is usually proportional to the concentration of the additive. This effect is particularly evident using crystalline polymers such as polypropylene and limits the amount of additives, including flame retardants, that can be present in a commercially useful product, which, in turn, limits the degree of flame retardancy that can be imparted using a given flame retarding agent. This has understandably resulted in a search for more efficient flame retarding agents which impart the highest possible degree of flame retardancy to a substrate at any given level of concentration.

One objective of this invention is to provide flame retarding agents which exhibit improved performance when compared with prior art products at equivalent levels of concentration. A second objective of this invention is to provide a method for improving the performance, particularly the efficiency, of a known class of flame retardants.

It is well known to employ organic esters of phosphoric acid and other phosphorous-containing acids to impart flame retardancy to various polymeric substrates. Up until now it has not been considered feasible to employ these esters in combination with conventional flame retardants containing a halogenated organic compound and antimony trioxide since it has been reported by Dr. C. P. Fenimore ("The Oxygen Index Test, A Measure of the Flammability of Plastics", presented at the University of Detroit Polymer Conference Series, June 8–12, 1970) that phosphorous destroys the antimony-halogen synergism by preventing the volatilization of antimony compounds. This conclusion is supported by experimental data in the accompanying examples. Surprisingly it has now been found that halogenated aromatic phosphates, thiophosphates and thiophosphoryl chlorides are unique among esters of phosphorous and thiophosphorous acids in their ability to enhance rather than inhibit the flame retardancy imparted to organic polymers by mixtures of antimony trioxide with halogen-containing organic compounds.

The presence of sulfur in the flame retarding agent decreases the amount of flame retardant required to attain a given level of performance. This is considered surprising since sulfur has not been shown to impart any significant degree of flame retardancy to flammable organic polymers.

SUMMARY OF THE INVENTION

This invention provides an improved composition for imparting flame retardancy to organic polymers, said composition being comprised at least in part of one or more halogen-containing organic compounds exhibiting a volatilization temperature above 200° C. and selected from the group consisting of halogenated paraffinic, olefinic and aromatic hydrocarbons, aliphatic hydroxylated compounds, aliphatic, cycloaliphatic and aromatic ethers, carboxylic acids and derivatives thereof, aldehydes, and ketones in combination with between about 8 and 100% based on the weight of said halogen-containing organic compound, of an antimony oxide, wherein the improvement resides in the presence of a phosphorus compound selected from the group consisting of tris(halophenyl) phosphates, tris(-halophenyl) thiophosphates, and bis(halophenyl) thiophosphoryl chlorides wherein each phenyl group exhibits at least three halogen atoms, in an amount between 0.5 and 20%, based on the combined weight of the halogen-containing organic compound and antimony oxide, all of the halogen in said composition being selected from chlorine and bromine. Optionally, the composition may also include up to 50% of sulfur, based on the weight of the phosphorus compound.

This invention also provides a method for reducing the degree of flaming and glowing combustion and eliminating the dripping of molten material exhibited by polymer compositions wherein the flame retarding agent is comprised at least in part of one or more of the aforementined halogen-containing organic compounds and between 8 and 100%, based on the weight of the halogen-containing organic compounds, of an antimony oxide, the method comprising incorporating into the flame retarding agent between 0.5% and 20%, based on the combined weight of antimony oxide and halogen-containing organic compound of one of the aforementioned phosphorus compounds and, optionally, up to 50% of sulfur, based on the weight of phosphorus compound.

DETAILED DESCRIPTION OF THE INVENTION

The addition of one or more tris(halophenyl) phosphates, thiophosphates or bis(halophenyl) thiophosphoryl chlorides to a polymer which has been flame retarded using a mixture of an antimony oxide and at least one halogenated organic compound significantly reduces the time required for both the flame and glowing to be extinguished once the polymer is ignited. The weight of phosphorus compound should not exceed about 20% based on the combined weight of the antimony oxide and halogenated compound. Above this level, the flame retardancy imparted to the substrate actually decreases rather than increases. This is believed due to the adverse effect of phosphorus compounds on the synergistic action of antimony oxide with the halogen-containing organic compound.

For example, the combination of 50 parts of perchloropentacyclodecane, a preferred halogen-containing compound and 17 parts by weight of antimony trioxide, per 100 parts of polypropylene yields a composition which burns for between 7 and 15 seconds following removal of the igniting flame and exhibits an afterglow for between 40 and 120 seconds. Increasing the concentration of either halogen compound or oxide yields at best a slight decrease in burning and afterglow times and, more importantly, adversely affects the physical and rheological properties of the polymer to a significant extent. By contrast, the addition of five parts of a tris(tribromophenyl) phosphate to the aforementioned composition yields a substantial reduction in burn and glow times without significantly affecting the physical properties of the polymer. The addition of halogenated alkyl phosphates have virtually no favorable effect on flame retardancy.

The efficiency of the flame-retarding agents of this invention is significantly increased by replacing up to 25% by weight of the phosphate with sulfur.

The flame-retarding agents of this invention are useful with many classes of natural and synthetic materials, including organic polymers which can be rendered flame retardant using the combination of an antimony oxide with a halogen-containing organic compound. Among the natural organic polymers are cellulosic materials such as cotton, wool, and wood. The flame retarding agents of this invention exhibit efficacy in reducing both burning and glowing combustion of most synthetic organic polymers including polyolefins, e.g. polyethylene and polypropylene; vinyl polymers including polystyrene and polyvinyl chloride; acrylic polymers including poly (methylacrylate) and polymers containing acrylonitrile, e.g. terpolymers of acrylonitrile, butadiene, and styrene; polyamides including nylon type polymers and polyesters derived from saturated and unsaturated acids, for example, fatty acids, and drying oils. The polyesters can be either linear or are crosslinked using appropriate curing agents, e.g. styrene. Epoxide polymers, e.g. those derived from the diglycidyl ether of bisphenol A [2,2-bis(4,4'-hydroxyphenyl) propane] or aliphatic alcohols or polyols, are also suitable substrates.

The halogen-containing organic compounds of this invention contain between 2 and 20 carbon atoms and preferably contain two or three fused carbocyclic ring structures, one or more of which may be of the bicyclic type as represented by the formula

and contain a plurality of chlorine or bromine atoms to the extent that halogen atoms may occupy all of the valences not satisfied by carbon-carbon bonds. The hydrocarbon radicals may be alkyl, cycloalkyl, aralkyl, aryl or alkaryl. Alternatively, the radical may contain one or more carbon to carbon double bonds. Various functional groups, e.g. hydroxyl, carboxy and carboxylate radicals may also be present on the molecule. Suitable halogen-containing compounds are represented by the generic formula $RX_mY_n$ wherein X represents a bromine or a chlorine atom, each Y is individually selected from the group consisting of hydrogen atoms and radicals exhibiting the formula

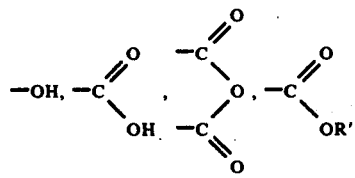

R and R' each represents an alkyl, cycloalkyl, aryl, alkaryl or aralkyl hydrocarbon radical containing between 2 and 20 carbon atoms. Alternatively, the compound may be present in polymerized form.

The following Table lists some representative compounds from the various classes of suitable halogenated compounds and the types of polymeric substrates wherein the compounds have been employed.

| CHLORINATED COMPOUNDS | |
|---|---|
| | USE |
| Alkanes | |
| Chloroethanes | Paint, polystyrene |
| Chloropropanes | Polyesters |
| Chlorinated $C_{16}$–$C_{30}$ paraffins | Paints, wood, textiles, polyolefins |
| Chlorinated fish oil | Paint |
| Chlorinated rubber | Rubber |
| Chlorinated PVC | Vinyls, textiles |
| Chlorinated polyisobutylene | Polyurethane |
| Chlorinated polyolefins | Polyolefins |
| Polyvinyl chloride | Textiles |
| Benzene hexachloride- $C_6H_6Cl_6$ | Cellulose derivatives |
| Olefins | |
| Chloroethylenes, vinyl chloride | Textiles, polystyrene, acrylics |
| Chloropropene | Polystyrene, vinyls, acrylics |
| Chlorobutene and butadiene | Rubber, vinyls |
| Chloroprene | Polyolefins |
| Vinyl chloroacetate | Polyesters, acrylics |
| Allyl chloride | Epoxies |
| Hexachlorocyclopentadiene and derivatives ("hex") | Paints, polyesters, polyurethanes, epoxies, polystyrene, acrylics |
| Chlorendic acid and derivatives | Polyesters, polyurethanes epoxies, vinyls |
| Alcohols, acids, aldehydes and other functional compounds | |
| Chloroalcohols ($C_2$–$C_{12}$) and polyols | Vinyls, polyesters |
| Pentaerythritol chlorohydrin | Polyesters, polyurethane |
| Tetrachlorobutane-1,4-diol | Epoxies |
| Alcohols, acids, aldehydes and other functional compounds (continued) | |
| Epichlorohydrin | Epoxies |
| 1,1,1-Trichloro-2,3 epoxypropane | Polyesters, polyurethane |
| Chloroadipic acid | Nylon, vinyls |

| CHLORINATED COMPOUNDS | USE |
|---|---|
| Vinyl chloroacetate | Polyesters |
| Dichlorosuccinic acid | Polyurethane |
| Chlorinated fatty acids | Polystyrene |
| Chloral | Polyurethane, epoxies, polyaldehydes |
| Chloroalkyl acrylonitrile | Acrylics |
| Chlorinated aryldiamines Aromatics | Epoxies |
| Alkoxychlorobenzenes | Vinyls |
| Chlorinated hexamethylbenzene | Vinyls |
| Chlorinated alkylaryl ethers | Polyesters |
| Chlorophenols | Textiles, styrene, acrylics, wood phenolics, polyphenylenes |
| Pentachlorophenol glycidyl ether | Polyurethane epoxies |
| Chlorostyrenes | Polyesters, polystyrene, polyolefins |
| Chlorothiophenol esters | Acrylics, vinyls |
| Chlorinated 1,4-bis-hydroxymethyl benzene | Cellulosics, textiles |
| Chlorophenyl isocyanate | Textiles |
| Chlorobiphenyls and polyphenyls | Textiles, polyesters, polyurethane, polystyrene |
| Chlorinated 4,4'-bis-hydroxy-biphenyl | Polyesters |
| Chlorinated 3,3'-bis-isocyanato-biphenyl | Polyurethanes |
| Chlorinated naphthalenes | Textiles, polyesters |
| Chlorinated bisphenol A and glycidyl ethers | Polyesters, epoxies |
| Chlorinated diphenyl carbonate | Polycarbonates |
| Tetrachlorophthalic acid and derivatives | Textiles, polyesters |
| Chlorinated alkyd resins | Paints |
| Chloranil 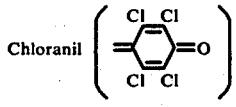 | Vinyls |

| BROMINATED COMPOUNDS | USE |
|---|---|
| Alkanes Bromoethanes | Vinyl Polymers |
| Bromocycloalkanes | Polyolefins |
| Bromocycloalkanol, acrylic acid ester | Acrylic Polymers |
| Brominated polybutadiene Olefins | Vinyl and styrene polymers |
| Vinyl bromide | Polystyrene, acrylics |
| Tetrabromododecene | Polyesters |
| Hexabromobicycloheptene derivatives | Acrylics |
| Brominated cyclododecatriene Hexabromo cyclopentadiene | |
| Alcohols, acids, aldehydes and other functional groups | |
| 2,3,3-Tribromoallyl alcohol and esters (e.g., acrylate esters) | Polystyrene, vinyls |
| 2,2,3,3-Tetrabromobutane-1,4-diol | Polystyrene |
| Brominated pentaeythritol | Polyesters |
| Brominated polyols | Polyurethanes |
| 2,3-Dibromopropyl phthalate | Paper |
| Brominated tall oil | Polyurethanes |
| 2,2-Bis(bromomethyl)-1,3-propanediol | Polyesters |
| 2-Bromoethyl itaconate | Polystyrene, acrylics |
| Dibromosuccinic acid | Polyesters |
| Bromoacetaldehyde, bromobenzaldehyde | Polyvinyl alcohol |
| Brominated amides -BrCH$_x$-R-CONR$^1$R$^2$, where R—C$_3$—C$_s$; R$^1$, R$^2$ are lower alkyls | Polyurethanes |
| Bis (2,3-dibromopropyl) malate Aromatics | Polystyrene |
| Brominated polyphenyls | Polyolefins |
| Pentabromotulene | Polyurethanes |
| Bromophenyl vinyl ether | Polyesters |
| Styrene dibromide | Polystyrene |
| Bromophenols, acrylate esters | Paints, polystyrene |
| Bromophenol, glycidyl ether | Polyesters |

| BROMINATED COMPOUNDS | USE |
|---|---|
| 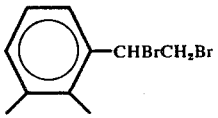 | Polyesters |
| Bromotoluene di-isocyanate | Polyurethanes |
| Tetrabromophthalic acid or anhydride | Polyesters |
| Bromophthalimide | Nylon type polymers |
| Tetrabromobisphenol A | Epoxies |
| Brominated salicylanilide | |

A preferred class of halogen-containing organic compounds are Diels-Alder reaction products of brominated or chlorinated cyclopentadiene with hydrocarbons, carboxylic acids or carboxylic acid anhydrides containing a carbocyclic ring structure and one or two carbon-carbon double bonds. The carbocyclic compounds are represented by cyclopentadiene, maleic anhydride and 1-cyclohexene-3,4-dicarboxylic acid.

Suitable halogen-containing compounds do not volatilize to any significant extent at temperatures below 200° C.

The effectiveness of halogen-containing organic compounds as flame retardants is markedly increased by using the halogen-containing organic compound in combination with antimony trioxide and a halogenated phosphorus compound selected from tris(halophenyl) phosphates, tris(halophenyl) thiophosphates and bis(-halophenyl) thiophosphoryl chlorides, wherein each phenyl radical contains at least three halogen atoms selected from bromine and chlorine.

The weight of halogen-containing organic compound should be equal to between one and twelve times the weight of antimony oxide. A slight reduction in the minimum amount of halogen-containing organic compound required can be achieved using a chlorinated paraffin wax as the halogen-containing organic compound. The combination of antimony oxide and halogen-containing compound comprises between 20% and 40% by weight of the present flame retardant composition. Using a higher concentration does not significantly improve flame retardancy and, more importantly, adversely affects the strength and other properties of the substrate material.

The concentration of total flame retarding agent, i.e. combination of antimony oxide, halogen-containing organic compound, halogenated phosphorus compound and, optionally, sulfur can be between 3% and 50% by weight of the substrate, depending upon the organic halogen source. As a general rule, a smaller amount of a bromine-containing compound will be required than a chlorine-containing compound to obtain an equivalent level of flame retardant performance. The concentration of halogen-containing organic compound required to impart flame retardancy to the various classes of organic polymers is discussed in detail in numerous publications, and it is, therefore, not considered necessary to repeat these values in the present specification.

The flame retardants of this invention decrease the ability of a material to support flaming combustion following removal of the igniting flame. They also have been shown to reduce or eliminate the "afterglow" which often persists once the flaming combustion has been extinguished. The glowing indicates that the material is continuing to smolder or burn slowly and may reignite into flaming combustion at a future time. In addition, the dripping of molten polymer from the heated material is for all intents and purposes eliminated. This cannot be achieved using prior art compositions, including those which employ substantially the same materials as those of the present invention but in different proportions than those specified herein.

The flame retarding agents of this invention can be incorporated into the inherently flammable polymer to be protected by combining the agents with the polymer before the resultant composition is fabricated to form a final product, for example, by molding, casting, or extrusion. Alternatively, the agents can be incorporated into a suitable coating material which is applied as a film to the substrate by brushing, spraying, or dipping. The coating materials are usually prepared by dissolving or dispersing the flame retarding agent in a liquid vehicle together with a suitable film-forming polymer. Suitable film-forming polymers are well known in the art relating to coatings and will not be discussed in the present specification. Poly(vinyl chloride) is preferred for this use, since in addition to providing a film it also functions as a source of available chlorine at flame temperatures. The concentration of flame retardant in the final film in between 20 and 40% by weight.

The Underwriter's Laboratory flammability test designated as UL 94 provides a convenient means for evaluating the efficacy of flame retarding agents for plastic materials. The test is described in the February, 1964 issue of the "Bulletin of Research for the Underwriter's Laboratory, Inc.", pages 42 and 43. Test samples conforming to specified dimensional limits are ignited, after which the igniting flame is removed and the time required for both the flame and any subsequent glowing to extinguish themselves is measured. Those samples which are rated self-extinguishing are further classified in order of decreasing flammability as SE-II, SE-I or SE-0, depending upon the burning and/or glowing time and whether or not the molten drippings from the sample will ignite cotton fibers placed below the sample. A rating of SE-II indicates that only the solid polymer is self-extinguishing within an average time of 25 seconds, based on five trials, following removal of the igniting flame. The molten material which drips from the flaming sample may ignite untreated cotton fibers placed twelve inches (30 cm.) below the test sample. Samples which qualify as SE-I are self-extinguishing within an average time of 25 seconds following removal of the igniting flame and do not drip flaming molten material. Any localized glowing must cease within 30 seconds following removal of the flame, not travel for more than 0.5 inch and be incapable of igniting surgical cotton. If the other SE-I requirements are met, the flame is extinguished within an average of five seconds following ignition, and no flaming particles are present, the samples are rated SE-O. The appropriate Underwriter's Laboratory publications should be consulted for a more complete description of the rating system employed for the UL 94 test procedure.

The following examples demonstrate the efficacy of the flame retarding agents of this invention and should not be interpreted as limiting the scope of this invention. All parts are by weight unless otherwise specified.

EXAMPLE 1

This example demonstrates the flame retardancy imparted to polypropylene using tris(2,4,6-tribromophenyl) phosphate in combination with antimony trioxide and various halogen-containing organic compounds as the flame retarding agent.

Test samples were prepared by combining the indicated amounts of flame retardant with 100 parts by weight of a commercial grade of powdered polypropylene manufactured by Hercules, Inc. (Profax 6523) on a two-roll mill. The resultant sheet was cut into pellets approximately 0.125 inch (0.317 cm.) in diameter. The pellets were injection molded at a temperature between 218° and 234° C. to form bars measuring 6 inches × 0.5 inch × 0.125 inch (15 cm. × 1.3 cm. × 0.317 cm.).

The data obtained from the UL 94 test are disclosed in Tables I and II, Samples 1, 6, 8, and 10 in Table I did not contain any phosphate and were employed as controls (CTRL). It should be noted that a class O rating in accordance with the UL 94 test was only achieved using the halogenated aromatic phosphate in combination with antimony oxide and the halogen-containing organic compound.

TABLE I

| SAMPLE NO. | 1 (CTRL) | 2 | 3 | 4 | 5 | 6 (CTRL) | 7 | 8 (CTRL) | 9 | 10 (CTRL) | 11 |
|---|---|---|---|---|---|---|---|---|---|---|---|
| Polypropylene (Profax®6523) | 100 | 100 | 100 | 100 | 100 | 100 | 100 | 100 | 100 | 100 | 100 |
| Antimony trioxide | 17 | 17 | — | 17 | — | 17 | 17 | 17 | 17 | 17 | 17 |
| Dechlorane®(1) | 50 | 50 | — | — | 50 | — | — | — | — | — | — |
| Chloran®(2) | — | — | — | — | — | — | — | 50 | 50 | — | — |
| Dichlor 1®(3) | — | — | — | — | — | 50 | 50 | — | — | — | — |
| Octabromobiphenyl | — | — | — | — | — | — | — | — | — | 50 | 50 |
| TTBPP (4) | 0 | 5 | 5 | 5 | 0 | 0 | 5 | 0 | 5 | 0 | 5 |
| UL 94 Class | I | 0 | fails (7) | fails (7) | fails (7) | I | I | fails (7) | 0 | I | 0 |
| Average burning time (5) | 7 | 2 | — | — | — | 5 | 5 | — | <1 | 6 | 2 |
| Average afterglow time (6) | 50 | 7 | — | — | — | 45 | 24 | — | 0 | 17 | 0 |

NOTES:
(1) Perchloropentacyclodecane
(2)
(3)

TABLE I-continued

| SAMPLE NO. | 1 (CTRL) | 2 | 3 | 4 | 5 | 6 (CTRL) | 7 | 8 (CTRL) | 9 | 10 (CTRL) | 11 |
|---|---|---|---|---|---|---|---|---|---|---|---|

(4) tris-(2,4,6-tribromophenyl) phosphate
(5) Elapsed time in seconds between ignition of sample and extinguishing of flame (6 trials).
(6) Elapsed time in seconds between extinguishing of flame and disappearance of glowing, as evidenced by red or orange-red coloration (6 trials).
(7) Samples were too flammable to qualify in any UL Class.

TABLE II

| | | | | |
|---|---|---|---|---|
| Profax 6523 (parts) | 200 | 200 | 200 | 200 |
| Antimony Trioxide (parts) | 40 | 40 | 40 | 34 |
| Chlorinated Diels-Alder Adduct[1] (parts) | 40 | 80 | 80 | 100 |
| TTBPP (See Table I) (parts) | 40 | 40 | 20 | 20 |
| Flame-out Time (seconds) | — | 2 | 4 | 2 |
| Afterglow Time (seconds) | — | 20-60 | 20-60 | 6 |
| UL 94 Rating | II | I | I | O |

Note:
[1]A 2:1 mole ratio Diels-Alder reaction product of hexachlorocyclopentadiene and 1,5-cyclooctadiene available under the tradename "Dechlorane Plus".

Control Samples 3, 4 and 5 demonstrate that tris(2,4,6-tribromophenyl) phosphate does not significantly reduce the flammability of polypropylene at the relatively low concentrations employed (5 parts) unless both the antimony oxide and halogen-containing organic compound are present.

EXAMPLE 2

The procedures described in Example 1 were used to incorporate tris(2,4,6-tribromophenyl) phosphate into a commercially available flame retardant polypropylene composition which contains about 37% by weight of a 3:1 weight ratio mixture of perchloropentacyclodecane:antimony trioxide. The addition of 10 parts by weight of tris(2,4,6-tribromophenyl) phosphate to 200 parts of the polypropylene composition resulted in a change in the UL 94 class from 1 to 0. The burning time decreased from six seconds to substantially zero, indicating that the sample would not support flaming combustion in air. The afterglow time decreased from 40 seconds to two seconds following addition of the phosphate.

EXAMPLE 3

This example demonstrates the increase in efficiency of the flame retardant achieved by the incorporation of sulfur in combination with a suitable phosphorus compound. The test samples were prepared as described in Example 1 and rated for flammability as described in UL 94 procedure. The composition and flame retardancy ratings are summarized in Table III wherein all concentrations are expressed in parts by weight.

TABLE III

| | Sample 1 | Sample 2 | Sample 3 | Sample 4 |
|---|---|---|---|---|
| Polypropylene (Profax 6523) | 225 | 225 | 225 | 225 |
| Perchloropentacyclodecane | 100 | 100 | 100 | 100 |
| Antimony trioxide | 33.4 | 33.4 | 33.4 | 33.4 |
| Tris(2,4,6-tribromophenyl) phosphate | 16.7 | 15.6 | — | — |
| Bis(tribromophenyl)trichlorophenyl phosphate | — | — | 16.8 | 15.9 |
| Sulfur | — | 1.1 | — | 1.1 |
| Flame-out time (seconds) | 5.5 | 3.0 | 7.0 | 4.0 |
| Afterglow time (seconds) | 21.0 | 7.0 | 30.0 | 6.0 |
| UL 94 Rating | SE-I | SE-O | SE-I | SE-O |

EXAMPLE 4

This example demonstrates other phosphorus compounds suitable for use in the flame retarding agents of this invention.

Using the procedure described in Example 1, test samples were prepared using the following polymer composition:
Polypropylene (Profax 6523); 100 parts
Antimony trioxide; 17 parts
Perchloropentacyclodecane; 50 parts This composition was rated SE-I in the UL 94 vertical burning test. The addition of 8 parts of one of the following phosphorus compounds yielded a test sample that was rated SE-0:

Tris(2,4,6-tribromophenyl) phosphate
Tris(2,4,6-trichlorophenyl) phosphate
Bis(2,4,6-tribromophenyl)-2,4,6-trichlorophenyl phosphate
Bis(2,4,6-trichlorphenyl)-2,4,6-tribromophenyl phosphate
Tris(2,4,6-tribromophenyl)thiophosphate
Bis(2,4,6-tribromophenyl)thiophosphoryl chloride
Tris(pentabromophenyl)phosphate

EXAMPLE 5

Test samples were prepared and rated for flammability using the procedures described in Example 1 and the polymer compositions set forth in Table IV. The concentration of the components comprising the flame retarding agents are expressed as parts by weight per 100 parts of the polymer. As in the previous examples a UL 94 Test rating of "0" can be achieved only in the presence of the tris(2,4,6-tribromophenyl) phosphate.

TABLE IV

|  | Set 1 | | Set 2 | | Set 3 | | Set 4 | | Set 5 | | Set 6 | |
| --- | --- | --- | --- | --- | --- | --- | --- | --- | --- | --- | --- | --- |
| Antimony trioxide (parts) | 13 | 13 | 15 | 15 | 15 | 15 | 17 | 17 | 13 | 13 | 5 | 5 |
| Perchloropentacyclodecane (parts) | 25 | 25 | 30 | 30 | 30 | 30 | 50 | 50 | 25 | 25 | — | — |
| Tris(2,4,6-tribromophenyl)phosphate (parts) | 0 | 8 | 0 | 8 | 0 | 8 | 0 | 8 | 0 | 8 | 0 | 8 |
| Acrylonitrile-butadiene-styrene copolymer (1)(parts) | 100 | 100 | — | — | — | — | — | — | — | — | — | — |
| Polystyrene (parts) | — | — | 100 | 100 | — | — | — | — | — | — | — | — |
| Styrene-acrylonitrile copolymer (2) (parts) | — | — | — | — | 100 | 100 | — | — | — | — | — | — |
| Polyethylene (parts) | — | — | — | — | — | — | 100 | 100 | — | — | — | — |
| Poly(methyl methacrylate)(parts) | — | — | — | — | — | — | — | — | 100 | 100 | — | — |
| Hetron 92 GT (3) (parts) | — | — | — | — | — | — | — | — | — | — | 100 | 100 |
| UL 94 Class | SE-I | SE-O | SE-I | SE-O | SE-I | SE-O | SE-I | SE-O | SE-I | SE-O | SE-I | SE-O |

NOTES:
(1) Available as Blendex 301 from Marbon Division of Borg-Warner Corporation.
(2) Available as RMDA-4511 from Union Carbide Chemical Corporation.
(3) An unsaturated polyester derived from chlorendic anhydride, ethylene glycol and diethylene glycol which has been crosslinked using styrene; available from Hooker Chemical Corporation.

EXAMPLE 6

The following composition was prepared using the procedure described in Example 1:
Polypropylene 100 parts
Chlorinated Paraffin Wax (70% weight chlorine): 4 parts
Antimony Oxide: 5 parts
Tris(2,4,6-tribromophenyl)phosphate: 5 parts The sample exhibited a rating of SE-II in the Ul 94 test and produced flaming molten material when heated by the flame.

EXAMPLE 7

This example demonstrates the unique performance of halogenated aromatic phosphates as flame retardants for polypropylene. The degree of flame retardancy (UL 94 Class 0) cannot be achieved using an equal concentration of phosphorus derived from representative inorganic or organic phosphates other than those of the present invention. The results of the flammability tests are summarized in Table V.

TABLE V

Effect of Various Phosphorus Compounds on Flammability

| Component | | | | | | | | |
| --- | --- | --- | --- | --- | --- | --- | --- | --- |
| Polypropylene (parts) | 200 | 200 | 200 | 200 | 200 | 200 | 200 | 200 |
| Chlorinated Diels Alder Adduct[1] (parts) | 100 | 100 | 100 | 100 | 100 | 100 | 100 | 100 |
| Antimony Trioxide (parts) | 34 | 34 | 34 | 34 | 34 | 34 | 34 | 34 |
| TTBPP (parts) | — | 16.7 | — | — | — | — | — | — |
| Tris(dibromopropyl)phosphate (parts) | — | — | 12.0 | 16.7 | — | — | — | — |
| Ammonium Phosphate (parts) | — | — | — | — | 2.2 | 16.7 | — | — |
| Tricresyl Phosphate (parts) | — | — | — | — | — | — | 5.8 | 16.7 |
| % Phosphorus in Composition | 0 | .06 | .06 | .085 | .06 | .45 | .06 | .18 |
| UL94 Classification | I | O | I | I | I | F | I | I |
| Flameout time (sec.) | 5 | 5 | 5.5 | 9.5 | 3.5 | — | 9 | 9.5 |
| Afterglow time (sec.) | 29 | 10 | 35 | 23 | — | 32 | 31 | — |

NOTE:
[1] A 2:1 mole ratio Diels-Alder reaction product of hexachlorocyclopentadiene and 1.5 cyclooctadiene.

This example demonstrates that a flame retardant composition described in British Pat. No. 1,076,608, which employes antimony oxide, a brominated aromatic phosphorus compound and a chlorine-containing paraffin in proportions which are outside the scope of this invention is markedly inferior in flame retarding ability when compared with the present compositions.

I claim:
1. A flame retardant composition comprising (a) a polyolefin and (b) between 20 and 40%, based on the weight of said composition, of a mixture consisting of one part by weight of antimony oxide, between one and twelve parts of a halogen-containing organic compound exhibiting a volatilization temperature above 200° C. and selected from the group consisting of Diels-Alder adducts derived from two moles of a hexahalocyclopentadiene per mole of a cyclic hydrocarbon containing two carbon-carbon double bonds, perhalocyclopentadecanes and halogenated biphenyls, and 0.5 to about 15%, based on the combined weight of the antimony oxide and halogen-containing organic compound, of at least one phosphorus compound selected from the group consisting of tris (halophenyl) phosphates and tris (halophenyl) thiophosphates, wherein each phenyl radical exhibits at least three halogen atoms and all halogens present in said flame retardant composition are selected from the group consisting of bromine and chlorine.

2. The flame retardant composition of claim 1 wherein the tris(halophenyl)phosphate is tris(2,4,6-tribromophenyl)phosphate.

3. A flame retardant composition comprising (a) a polymer selected from the group consisting of polymers of acrylic acid esters, polystyrene, crosslinked products derived from unsaturated polyesters and copolymers of acrylonitrile with at least one comonomer selected from the group consisting of styrene and butadiene, (b) between 20 and 40%, based on the weight of said composition, of a mixture consisting of one part by weight of antimony oxide, between one and twelve parts of a halogen-containing organic compound exhibiting a volatilization temperature above 200° C. and selected from the group consisting of Diels-Alder adducts derived from two moles of a hexahalocyclopentadiene per mole of a cyclic hydrocarbon containing two carbon-carbon double bonds, perhalocyclopentadecanes and halogenated biphenyls, and between 0.5 and 20%, based on the combined weight of the antimony oxide and halogen-containing organic compound, of at least one tris(halophenyl)phosphate, wherein each phenyl radical exhibits at least three halogen atoms and all halogens present in said flame retardant compositions are selected from the group consisting of bromine and chlorine.

4. The improved flame retardant composition of claim 3 wherein the tris(halophenyl)phosphate is tris(2,4,6-tribromophenyl)phosphate.

5. A composition for enhancing the resistance of flammable polymers to both flaming and glowing combustion, consisting of one part by weight of antimony oxide, between one and twelve parts of a halogen-containing organic compound exhibiting a volatilization temperature above 200° C. and selected from the group consisting of Diels-Alder adducts derived from two moles of a hexahalocyclopentadiene per mole of a cyclic hydrocarbon containing two carbon-carbon double bonds, perhalocyclopentadecanes and halogenated biphenyls, and 0.5 to about 20%, based on the combined weight of the antimony oxide and halogen-containing organic compound, of at least one phosphorus compound selected from the group consisting of tris(halophenyl)phosphates and tris(halophenyl)thiophosphates, wherein each phenyl radical exhibits at least three halogen atoms and all halogens present in the flame retardant are selected from the group consisting of bromine and chlorine.

6. The composition of claim 5 wherein the tris(halophenyl)phosphate is tris(2,4,6-tribromophenyl)phosphate.

* * * * *